US008485680B2

(12) United States Patent
Anderson et al.

(10) Patent No.: US 8,485,680 B2
(45) Date of Patent: Jul. 16, 2013

(54) ILLUMINATED VEHICLE CUP HOLDER ASSEMBLY

(75) Inventors: James B. Anderson, Cookeville, TN (US); Brent H. Robbins, Cookeville, TN (US)

(73) Assignee: Federal-Mogul Ignition Company, Southfield, MI (US)

( * ) Notice: Subject to any disclaimer, the term of this patent is extended or adjusted under 35 U.S.C. 154(b) by 6 days.

(21) Appl. No.: 13/018,506

(22) Filed: Feb. 1, 2011

(65) Prior Publication Data
US 2011/0261579 A1    Oct. 27, 2011

Related U.S. Application Data

(60) Provisional application No. 61/300,260, filed on Feb. 1, 2010.

(51) Int. Cl.
*F21V 33/00* (2006.01)

(52) U.S. Cl.
USPC ........ 362/101; 362/488; 362/551; 248/311.2; 248/316.8; 224/926

(58) Field of Classification Search
USPC ....... 362/488, 101, 154, 511, 551; 248/311.2, 248/346.11, 310, 312.1, 316.8; 224/926; 297/188.14
See application file for complete search history.

(56) References Cited

U.S. PATENT DOCUMENTS

| 4,446,508 | A | * | 5/1984 | Kinzie ........................... 362/602 |
| 5,915,832 | A | | 6/1999 | Baird, Sr. |
| 6,168,302 | B1 | | 1/2001 | Hulse |
| 6,234,439 | B1 | | 5/2001 | Townsend et al. |
| 6,550,940 | B2 | | 4/2003 | Kamiya et al. |
| 6,637,709 | B1 | * | 10/2003 | Guenther et al. .......... 248/311.2 |
| 6,786,614 | B2 | | 9/2004 | Ciarrocchi, Jr. |
| 6,896,387 | B2 | | 5/2005 | Renfro |
| 7,229,196 | B2 | | 6/2007 | Hulse |
| 7,322,500 | B2 | * | 1/2008 | Maierholzner ............... 224/486 |
| 2002/0102058 | A1 | | 8/2002 | Hulse |
| 2007/0221805 | A1 | | 9/2007 | Baek |
| 2007/0247836 | A1 | | 10/2007 | Seidl et al. |

FOREIGN PATENT DOCUMENTS

| DE | 19953502 A1 | 5/2001 |
| DE | EP 1 428 724 A1 | 6/2004 |
| DE | 102005035282 A1 | 2/2007 |

* cited by examiner

*Primary Examiner* — Thomas Sember
(74) *Attorney, Agent, or Firm* — Robert L. Stearns; Dickinson Wright, PLLC

(57) ABSTRACT

An illuminated cup holder assembly constructed in accordance with one aspect of the invention facilitates the ability to see the cup holder in darkness while also providing an aesthetically pleasing, uniformly illuminated cup holder. The cup holder assembly includes a cup receptacle having an annular outer wall configured to receive a cup. A flexible, resilient finger extends radially inwardly from the annular wall, wherein the finger is configured to engage the cup to inhibit the cup from inadvertent movement in the cup receptacle. The finger has a translucent portion configured in communication with a light source to allow light to be emitted from the light source through the translucent portion into the cup receptacle.

17 Claims, 6 Drawing Sheets

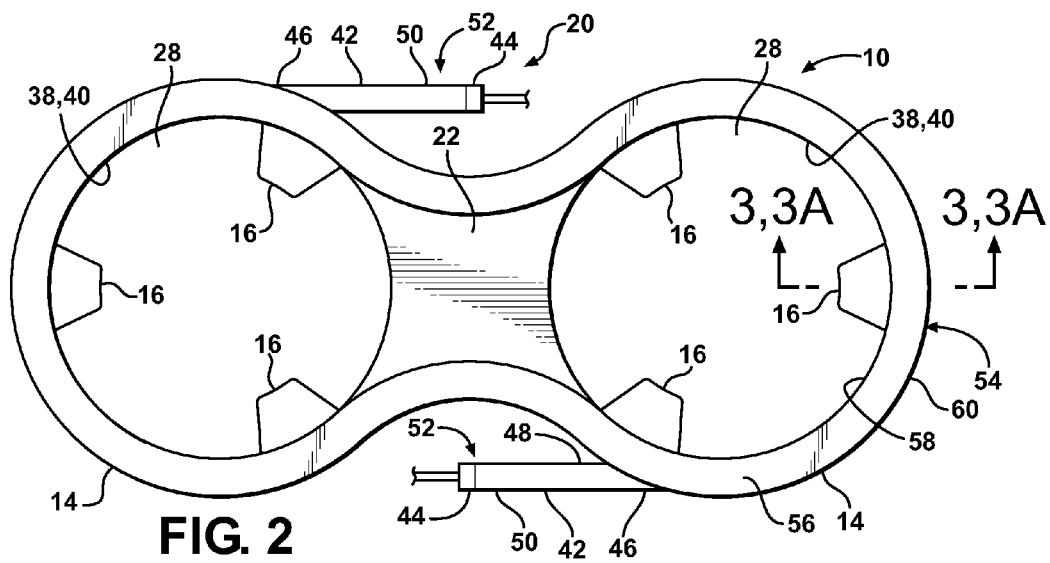
FIG. 2
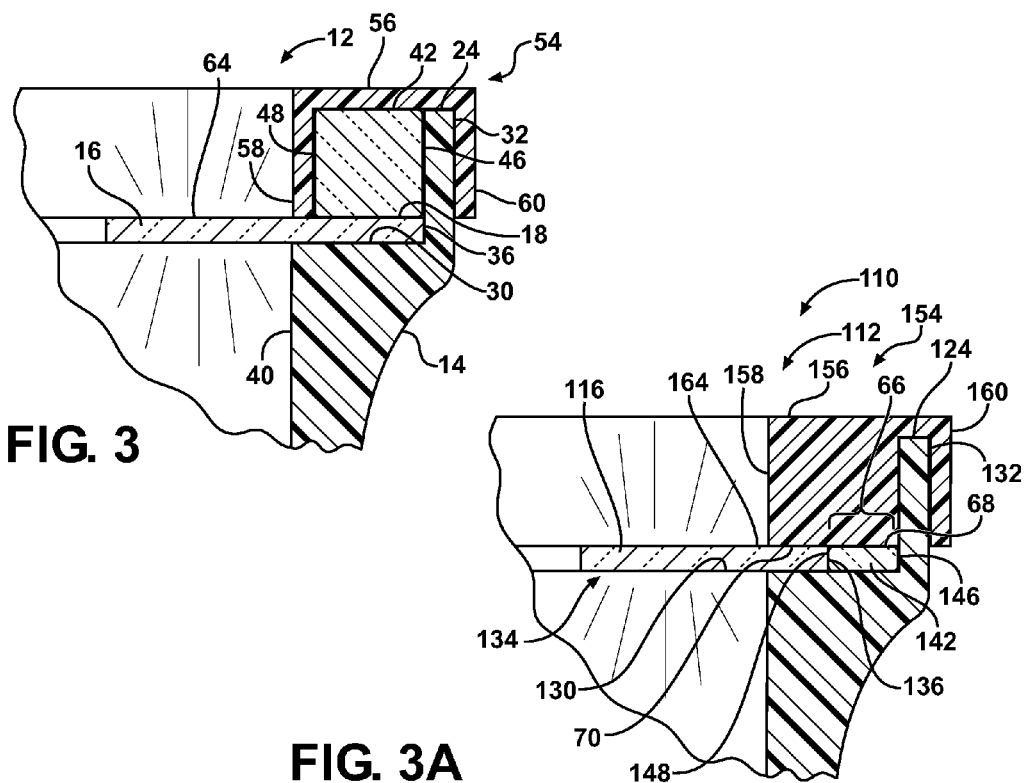
FIG. 3
FIG. 3A

ILLUMINATED VEHICLE CUP HOLDER ASSEMBLY

CROSS-REFERENCE TO RELATED APPLICATION

This application claims the benefit of U.S. Provisional Application Ser. No. 61/300,260, filed Feb. 1, 2010, which is incorporated herein by reference in its entirety.

BACKGROUND OF THE INVENTION

1. Technical Field

This invention relates generally to vehicle cup holders, and more particularly to vehicle cup holders illuminated with distributed light.

2. Related Art

Vehicle cup holders are typically located near the driver and passenger seats in a location convenient to reach. During daylight, the cup holders are easy to locate visually, and thus, there is generally no problem finding and placing a cup in the holder. However, when the interior of the vehicle is dark, cup holders can prove difficult to see, and thus, placing a cup in the cup holder can prove to be difficult.

In an effort to remedy the problem of locating a cup holder within a dark vehicle, lights have bee disposed in the cup holder to illuminate the cup holder, thereby making it easier to see. The lights have been provided as light pipes, sometimes referred to as wave guides, to allow light to be distributed to the cup holder from a remote light source. Typically, the light pipe is a separate component disposed in the cup holder, and thus, the component cost, handling costs and associated manufacturing cost are increased. In addition, problems exist with efforts to illuminate a cup holder uniformly, and further problems exist with trying to maintain the light source from being directly visible, particularly if the cup holder has cup adjusters. Cup adjusters are commonly employed as hinged, solid pieces of opaque material that extend radially inwardly toward the center of the cup holder to engage and steady the cup placed therein while at the same time allowing the cup to be readily removed from the cup holder. Although useful, the cup adjusters pose the aforementioned problem of preventing the cup holder from being uniformly illuminated without having the source of illumination being in direct sight, which is considered aesthetically undesirable.

SUMMARY OF THE INVENTION

An illuminated cup holder assembly constructed in accordance with one aspect of the invention facilitates the ability to see the cup holder within a dimly lit or otherwise dark vehicle while also providing an aesthetically pleasing, uniformly illuminated cup holder. The cup holder assembly includes a cup receptacle having an annular outer wall configured to receive a cup. At least one flexible, resilient finger extends radially inwardly from the outer wall, wherein the finger is configured to engage the cup to inhibit the cup from unwanted movement in the cup receptacle. The finger has a translucent portion configured in communication with a light source to allow light to be emitted from the light source through the translucent portion and into the cup receptacle.

In accordance with another aspect of the invention, the finger has an opaque upper surface to prevent light from being emitted upwardly from the translucent portion while allowing light to be uniformly emitted downwardly from the translucent portion into the cup holder.

In accordance with yet another aspect of the invention, the cup holder assembly includes a plurality of the fingers connected to one another by a body and further includes a light pipe abutting the body in light transmitting communication with the light source.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

FIG. 2 is an assembled top view of the cup holder assembly of FIG. 1;

FIG. 3 is a cross-sectional view taken generally along the line 3-3 of FIG. 2;

FIG. 3A is a cross-sectional view taken generally along the line 3A-3A of FIG. 2 of a cup holder assembly constructed according to another aspect of the invention;

DETAILED DESCRIPTION OF PRESENTLY PREFERRED EMBODIMENTS

Figure 1:
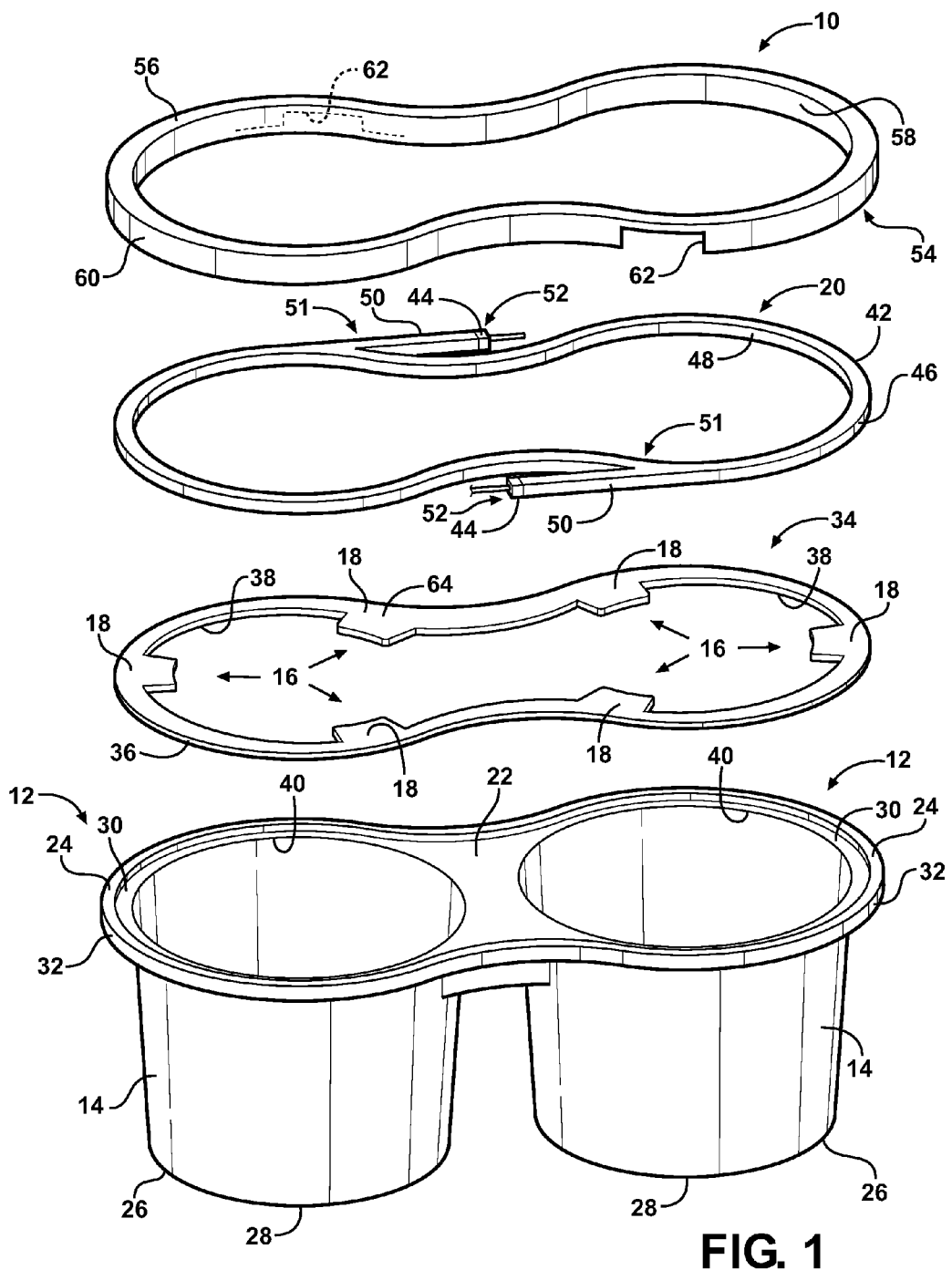
FIG. 1 is an exploded perspective view of a cup holder assembly constructed in accordance with one aspect of the invention.

Referring in more detail to the drawings, FIG. 1 illustrates an exploded view of a cup holder assembly 10 configured in accordance with one presently preferred aspect of the invention. The cup holder assembly 10 includes at least one, and shown here, by way of example and without limitation, as a pair of interconnected, side-by-side cup receptacles 12. Each receptacle 12 has an annular outer wall 14 configured to receive a cup (not shown). At least one flexible, resilient finger, and shown here as a plurality of fingers 16, extend radially inwardly from the outer wall 14. The fingers 16 are configured to engage the cup to inhibit the cup from inadvertent or otherwise unwanted movement while in the cup receptacle 12. The fingers 16 have a translucent portion 18 configured in light transmitting communication with a light source, shown generally at 20, such that light emitted from the light source 20 travels through and outwardly from the translucent portion 18 into the cup receptacle 12. The illumination provided by the fingers 16 is transmitted uniformly throughout the receptacle 12 such that a viewer of the receptacle 12 views a uniform and aesthetically pleasing illuminated cup receptacle 12.

The pair of receptacles 12 are shown in the drawings, by way of example and without limitation, as being formed as a single, monolithic piece of material, such as in a molding process, and thus, they are interconnected by an intermediate section 22. Each receptacle 12 has a top or upper end 24 and a bottom or lower end 26 with a support base 28 being formed at the lower end 26 to support a bottom of the cup. The receptacles 12 are shown as being generally cylindrical in shape, though other shapes are contemplated, such as rectangular, frustroconical, or otherwise. The upper end 24 has a planar surface 30 extending about its periphery, with the planar surface 30 being shown as extending radially outwardly from the receptacles 12 and being generally FIG. 8 or spectacle shaped. Further, a rim, also referred to as lip 32, extends upwardly from the planar surface 30 about an outermost periphery of the planar surface 30.

The fingers 16 can be provided as separate, discrete components formed separately from one another, or, as shown in FIG. 1, they can be interconnected to one another as a single, monolithic body 34. The body 34 is constructed of a light transmissive, flexible, translucent, resilient material, such as urethane or urethane like material, for example. The body 34 has an outer periphery 36 that conforms in shape with the lip 32, wherein the outer periphery 36 is sized to be received in a close, substantially line-to-line fit inside the lip 32, as shown in FIG. 3. An inner periphery 38 of the body 34 is also shaped to conform or substantially conform with an inner perimeter 40 of the planar surface 30 so that upon assembly, the inner perimeter 38, other than the fingers 16 themselves, is flush or substantially flush with the inner perimeter 40 of the receptacles 12. The fingers 16, shown as three for each receptacle 12, by way of example, are spaced equidistantly from one another and extend radially inwardly from the inner perimeter 38 for engagement with a cup disposed in the respective receptacle 12. It should be recognized that more or fewer fingers 16 could be formed to extend radially inwardly in each receptacle 12. Accordingly, the fingers 16 extend into the receptacles 12, while the remaining portion or substantially the remaining portion of the body 34 lies over the planar surface 30 of the outer wall 14.

The light source 20, as shown in FIGS. 1-3, for example, includes a light pipe 42 and a light emitter 44, e.g., and LED. The light pipe 42 is configured having a generally FIG. 8 or spectacle shape to conform with and abut the portion of the body 34 resting on the planar surface 30. Accordingly, the light pipe 42 overlies the body 34, as shown in FIG. 3, and has an outer periphery 46 aligned flush or substantially flush with the outer periphery 36 of the body 34 and an inner periphery 48 that is set back in radially outward relation with the inner perimeter 40 of the receptacles 12. In addition, the light pipe 42 has an arm, also referred to as extension 50, diverging outwardly from the spectacle shaped portion at a generally T or Y-shaped junction 51. The extension 50 terminates at a connector shown generally at 52 that is configured for operable light transmitting attachment to the light emitter 44.

The assembly 10 further includes an opaque cover 54. The cover 54 is generally FIG. 8 or spectacle shaped to conform with and overlie the light pipe 42. As best shown in FIG. 3, the cover has an upper wall 56 with a pair of sidewalls, including an inner sidewall 58 and an outer sidewall 60, depending therefrom. To facilitate positioning the cover 54 over the light pipe 42, the outer sidewall 60 has notches 62 located to receive the junction 51 therein, and thus, the extension 50 of the light pipe 42 is able to extend outwardly from the cover 54 without causing obstruction or interference between the light pipe 50 and the cover 54.

As shown in FIGS. 2 and 3, upon assembly of the cover 54 over the light pipe 42, the light pipe 42 is fully concealed, and thus, the light passing through the light pipe 42 is unobservable to a viewer. The sidewalls 58, 60 of the cover 54 are configured to fit over the inner periphery 48 of the light pipe 42 and over the outer periphery of the receptacle lip 32, respectively, such that the inner sidewall 58 comes into abutment with an upper surface 64 of the body 34 interconnecting the fingers 16. Accordingly, all that is seen by the viewer is the outer, opaque surface of the cover 54, and the fingers 16 extending radially inwardly of the sidewall 58. As such, in use, the light transmitted from the light emitter 44 travels completely throughout the light pipe 42 in undetected fashion, such that the light traveling through the light pip 42 remains unobservable to the viewer. Upon traveling through the light pipe 42, the light travels into the fingers 16, wherein the light is able to radiate outwardly from the fingers 16 uniformly or substantially uniformly in all directions. As such, the light emitted from the fingers 16 uniformly or substantially uniformly illuminates the entire inside portion of the receptacles 12 while also shining upwardly for observance by the viewer, as shown in FIG. 3. Thus, aside from the flexible, resilient fingers 16 performing a retention function to maintain the cup against inadvertent movement within the receptacles 12, the fingers 16 function to illuminate the receptacles 12 for observance by the viewer.

In FIG. 3A, a portion of a cup holder assembly 110 constructed in accordance with another aspect of the invention is shown, where the same reference numerals as used above, offset by a factor of 100, are used to identify like features. The assembly 110 is constructed similarly as discussed above with regard to the assembly 10, and thus, only the notable differences are discussed hereafter. The assembly 110 has a cup receptacle 112 with an upper end 124 constructed generally the same as discussed with regard to the upper end 24. Further, the assembly has fingers 116 interconnected to one another as a single, monolithic body 134 of a light transmissive, flexible, translucent, resilient material. The body 134 has an outer periphery 136 that conforms or substantially conforms in shape with a lip 132 of the receptacle upper end 124, however, unlike the previous embodiment, the outer periphery 136 is not sized to be received in a close, substantially line-to-line fit inside the lip 132, but rather, is sized for a radially spaced clearance fit with the lip 132 to provide a uniform or substantially uniform annular gap 66 of a predetermined width extending between the lip 132 and the outer periphery 136. Otherwise, the body 134 is substantially the same as discussed with regard to the body 34.

As with the previous assembly 10, the assembly 110 includes a light source 120 having a light pipe 142 and a light emitter (not shown). The light pipe 142 has a width extending between an inner periphery 148 and an outer periphery 146 that is configured for receipt in the gap 66 to occupy or substantially occupy the entire width of the gap 66. Accordingly, the light pipe 142, rather than overlying the body 134, as in the previous embodiment, is coplanar or substantially coplanar with the body 134 and abuts the outer periphery 136 of the body 134 and the inner periphery of the lip 132. In addition, the light pipe 142 is shown having a thickness generally the same as the body 134, and thus, has an upper surface 68 that is generally flush and coplanar with an upper surface 164 of the body 134.

The assembly 110 further includes an opaque cover 154. The cover 154, as with the previous cover 54, has an upper wall 156 with a pair of sidewalls, including an inner sidewall 158 and an outer sidewall 160. However, unlike the previously discussed cover 54, an annular recessed slot or pocket extends between the sidewalls 158, 160 that is sized for close receipt of the receptacle lip 132 therein, wherein the inner sidewall 158 has a width that is the same or substantially the same as a planar surface 130 of the receptacle 112. As such, upon positioning the cover 154 on the receptacle 112, the inner sidewall 158 has a lower surface 70 that confronts and overlies a portion of the body 134 and also the upper surface 68 of the light pipe 142. Otherwise, the assembly 110 is generally the same as discussed with regard to the assembly 10, and thus, no further discussion is believed necessary.

Figure 4:
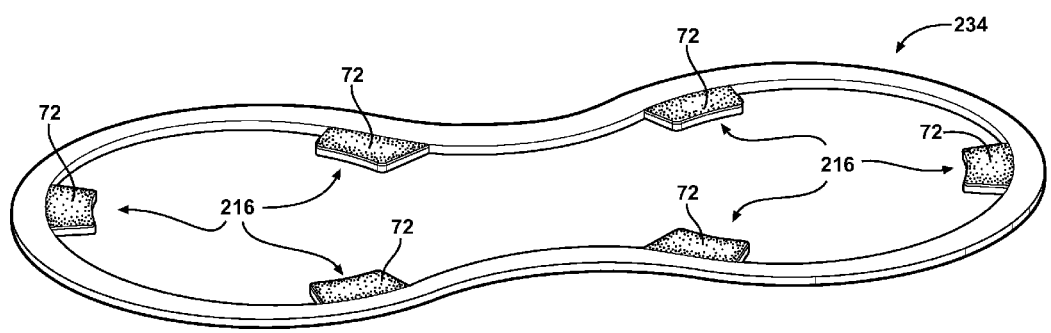
FIG. 4 is a flexible light transmitting cup adjuster of a cup holder assembly constructed in accordance with another aspect of the invention.
Figure 5:
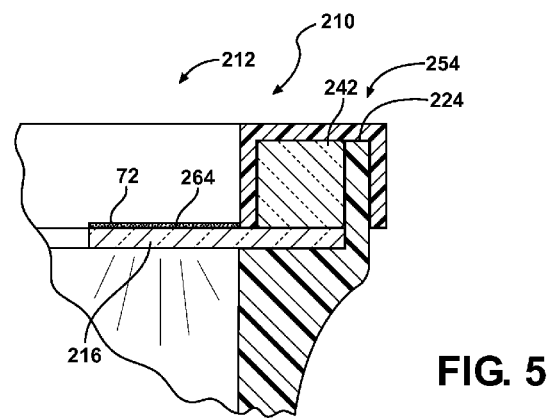
FIG. 5 is a cross-sectional view similar to FIG. 3 of a cup holder assembly incorporating the cup adjuster of FIG. 4.

In FIGS. 4 and 5, a portion of a cup holder assembly 210 constructed in accordance with another aspect of the invention is shown, where the same reference numerals as used above, offset by a factor of 200, are used to identify like features. The assembly 210 is constructed similarly to that as discussed above with regard to the assembly 10, and thus, only the notable differences are discussed hereafter. The assembly 210 has a receptacle 212, a light source 242, a cover 254, and fingers 216 provided as a single, monolithic body 234. The body 234 is constructed generally the same as discussed above with regard to the body 34, however, an opaque surface 72 is provided on an upper surface 264 of the fingers 216. The opaque surface 72 prevents light from being emitted upwardly from the fingers 216 toward and outwardly from an upper end 224 of the cup receptacle 212. The opaque surface 72 can be provided as a painted surface or as a separate piece of material attached, such as via an adhesive, for example, to the upper surface 264 of the fingers 216, such that the fingers 216 are constructed of a light transmissive first material and the opaque upper surface 72 is constructed of an opaque second material different from the first material. Otherwise, the assembly 210 is generally the same as discussed with regard to the assemblies 10, 110, and thus, no further discussion is believed necessary.

Figure 6:
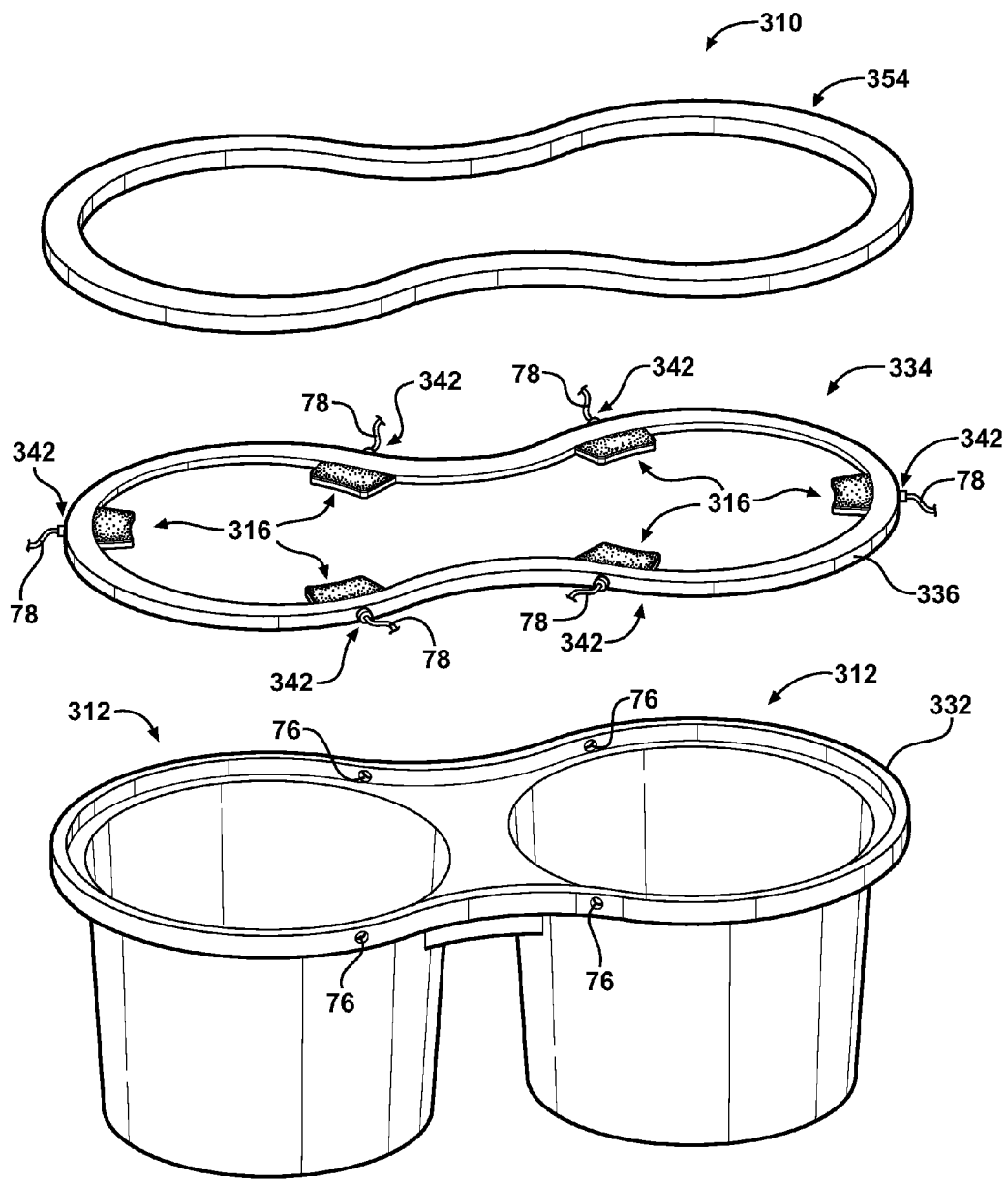
FIG. 6 is an exploded perspective view of a cup holder assembly constructed in accordance with another aspect of the invention.
Figure 7:
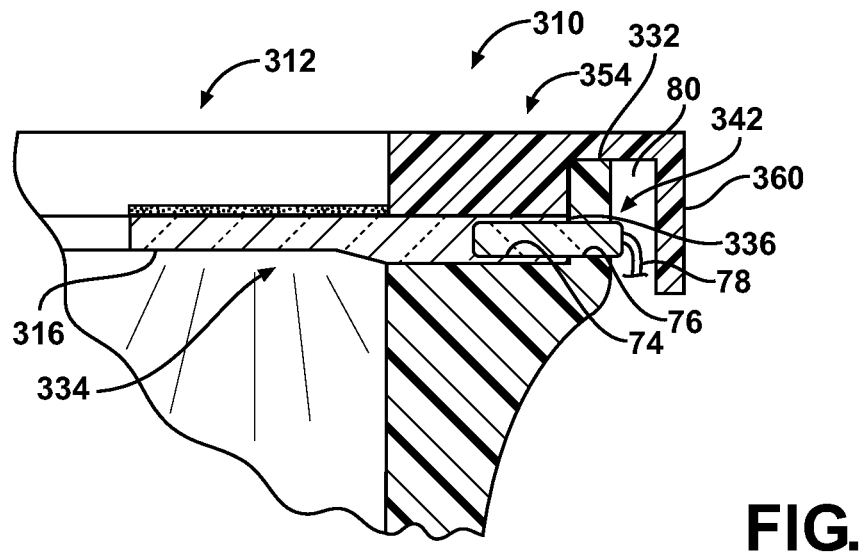
FIG. 7 is a cross-sectional view similar to FIG. 3 of the cup holder assembly of FIG. 6.

In FIGS. 6 and 7, a portion of a cup holder assembly 310 constructed in accordance with another aspect of the invention is shown, where the same reference numerals as used above, offset by a factor of 300, are used to identify like features. The assembly 310 is constructed similarly to that as discussed above with regard to the assembly 210, and thus, only the notable differences are discussed hereafter. The assembly 310 has a receptacle 312, a light source, and shown here as a plurality of discrete light sources 342, a cover 354, and fingers 316 provided as a single, monolithic body 334. The body 334 is constructed generally the same as discussed above with regard to the body 234, however, a plurality of blind pockets 74 are provided extending radially into an outer periphery 336 of the body 334 for receipt of the individual light sources 342, such as individually wired LED's, by way of example and without limitation. As such, in this embodiment, there is no separate light transmissive light tube, but rather, the light emits directly from the individual light sources 342 into the light transmissive body 334 of the fingers 316.

In addition, the receptacles 312 have an upstanding lip 332 with individual through openings 76 extending through the lip 332 for receipt of the light sources 342 therethough. The openings 76 are spaced circumferentially about the individual receptacles 312 as desired to position the light sources 342 in their desired location.

In order to accommodate any electrical wires 78 connected to the light sources 342, the cover 354 is constructed having an outer sidewall 360 spaced radially outwardly from the lip 332 to provide an annular gap 80 extending between the outer sidewall 360 and the lip 332, wherein the gap 80 is open in a depending, downward direction to allow the wires 78 to extend freely outwardly therefrom, as shown in FIG. 7. Otherwise, the assembly 310 is generally the same as discussed with regard to the above assemblies 10, 110, 210, and thus, no further discussion is believed necessary.

Figure 9:
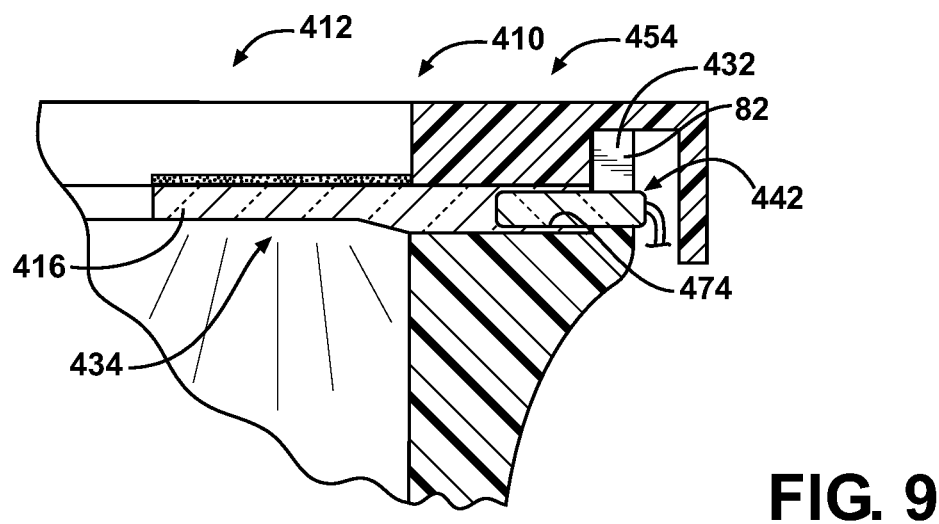
FIG. 9 is a cross-sectional view similar to FIG. 3 of the cup holder assembly of FIG. 8.
Figure 8:
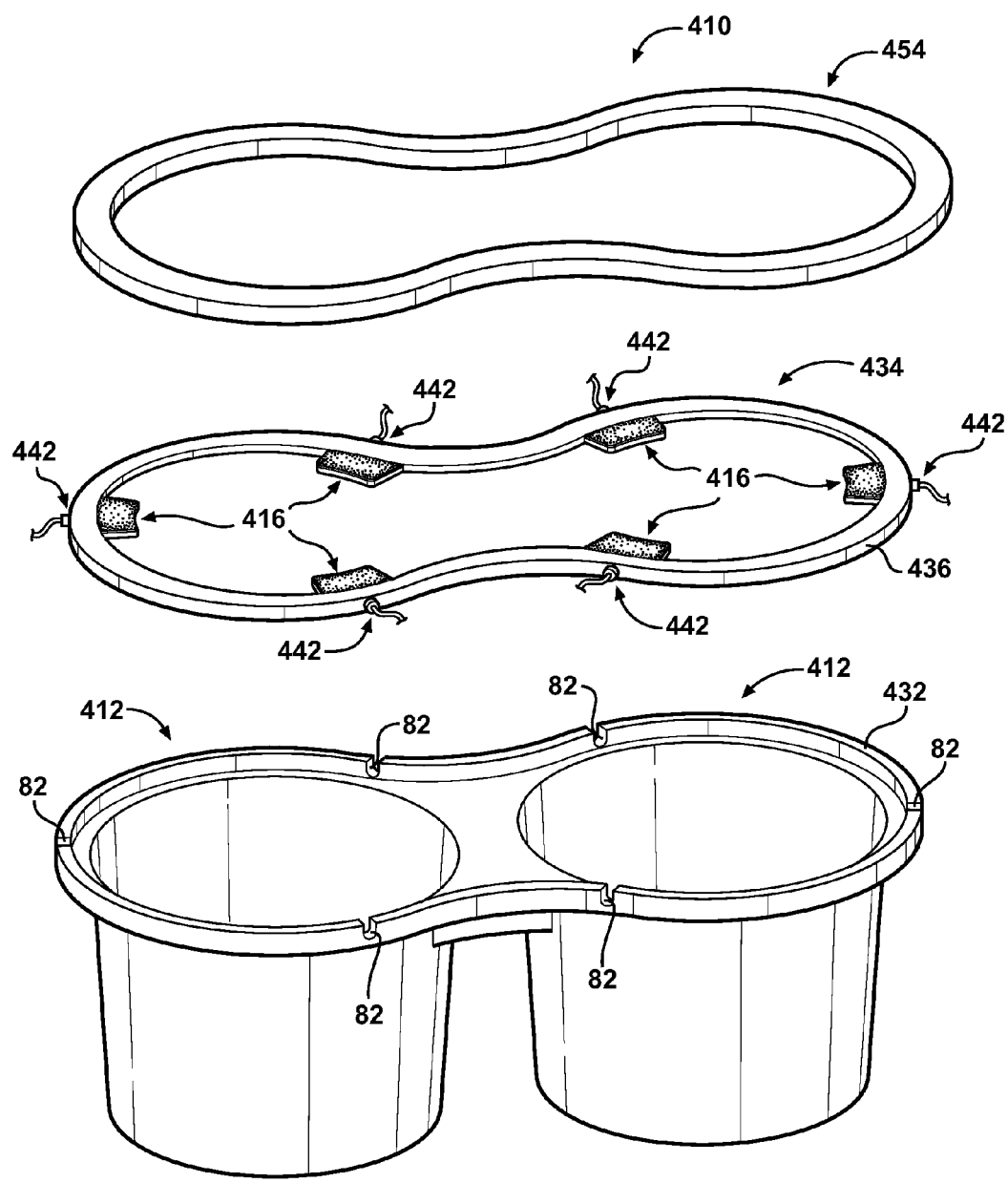
FIG. 8 is an exploded perspective view of a flexible light transmitting cup adjuster of a cup holder assembly constructed in accordance with yet another aspect of the invention.

In FIGS. 8 and 9, a portion of a cup holder assembly 410 constructed in accordance with another aspect of the invention is shown, where the same reference numerals as used above, offset by a factor of 400, are used to identify like features. The assembly 410 is constructed similarly to that as discussed above with regard to the assembly 310, and thus, only the notable differences are discussed hereafter. The assembly 410 has a receptacle 412, a light source, and shown here as a plurality of discrete light sources 442, a cover 454, and fingers 416 provided as a single, monolithic body 434. The body 434 is constructed the same as discussed above with regard to the body 334, and thus, has a plurality of blind pockets 474 extending radially into an outer periphery 436 of the body 434 for receipt of the individual light sources 442.

In addition, the receptacles 412 have an upstanding lip 432, however, unlike the lip 332 which has individual through openings 76 extending through the lip 332, the lip 432 has individual recessed notches 82 depending downwardly therein for receipt of the light sources 442 therein. The notches 82 are spaced circumferentially about the individual receptacles 412 as desired to position the light sources 442 in their desired location. Accordingly, rather than having to first assemble the body 434 to the receptacles 412, and then insert the light sources through an opening and into the pockets of the body 434, the light sources 442 can first be assembled into the blind pockets 474 of the body 434, and then the subassembly of the body 434 and the lights sources 442 can be assembled to the receptacles 412. This is permitted due to the light sources 442 and the wires of the light sources 442 being able to be disposed downwardly within the open notches 82 rather than having to be inserted through a circumferentially enclosed opening. Otherwise, the assembly 410 is generally the same as discussed with regard to the above assemblies 10, 110, 210, 310, and thus, no further discussion is believed necessary.

Obviously, many modifications and variations of the present invention are possible in light of the above teachings. It is, therefore, to be understood that within the scope of the appended claims, the invention may be practiced otherwise than as specifically described.

What is claimed is:

1. An illuminated cup holder assembly, comprising:
a cup receptacle having an annular outer wall configured to receive a cup;
a light source;
a flexible, resilient finger extending radially inwardly from said annular wall and configured to engage the cup to inhibit the cup from inadvertent movement in said cup receptacle, said finger having a translucent portion configured in communication with said light source to allow light to be emitted from said light source and through said translucent portion into said cup receptacle; and
wherein said cup receptacle has an upper end and a lower end and said finger has an opaque upper surface preventing light from being emitted upwardly from said finger toward said upper end of said cup receptacle.

2. The cup holder assembly of claim 1 wherein said finger is constructed of a first material and said opaque upper surface is constructed of a second material different from said first material.

3. An illuminated cup holder assembly, comprising:
a cup receptacle having an annular outer wall configured to receive a cup;
a light source;
a plurality of flexible, resilient fingers extending radially inwardly from said annular wall and configured to engage the cup to inhibit the cup from inadvertent movement in said cup receptacle, said fingers having a translucent portion configured in communication with said light source to allow light to be emitted from said light source and through said translucent portion into said cup receptacle; and wherein a single one of said light source transmits light to said fingers.

4. The cup holder assembly of claim 3 wherein said fingers are connected to one another by a body constructed as a single piece of material.

5. The cup holder assembly of claim 4 further comprising a light pipe constructed from a separated piece of material from said body, said light pipe abutting said body.

6. The cup holder assembly of claim 5 wherein said light pipe overlies said body.

7. The cup holder assembly of claim 5 wherein said light pipe is radially outward from said body.

8. The cup holder assembly of claim 7 wherein said light pipe extends in coplanar relation with said body.

9. The cup holder assembly of claim 4 wherein said cup holder has a plurality of said cup receptacles, a single one of said body being configured to extend about each of said cup receptacles.

10. The cup holder assembly of claim 9 further comprising a light pipe constructed from a separated piece of material from said body, said light pipe extending substantially about and abutting said body.

11. The cup holder assembly of claim 10 wherein said light pipe has a separate connecter for each of said cup receptacles, each connecter being configured in communication with a separate light source.

12. The cup holder assembly of claim 10 wherein said light pipe extends radially outwardly from an outer periphery of said body.

13. The cup holder assembly of claim 12 wherein said light pipe extends in coplanar relation with said body.

14. The cup holder assembly of claim 10 wherein said body has a planar surface and said light pipe overlies said planar surface in abutment therewith.

15. An illuminated cup holder assembly, comprising:
a cup receptacle having an annular outer wall configured to receive a cup;
a light source;
a plurality of flexible, resilient fingers extending radially inwardly from said annular wall and configured to engage the cup to inhibit the cup from inadvertent movement in said cup receptacle, said fingers having a translucent portion configured in communication with said light source to allow light to be emitted from said light source and through said translucent portion into said cup receptacle; and
wherein said fingers are constructed as a single piece body of material with one another.

16. The cup holder assembly of claim 15 further comprising a light pipe constructed from a separated piece of material from said body, said light pipe abutting said body.

17. The cup holder assembly of claim 15 wherein said cup holder has a plurality of said cup receptacles, a single one of said body being configured to extend about each of said cup receptacles.

* * * * *